(12) United States Patent
Mohan

(10) Patent No.: US 9,338,052 B2
(45) Date of Patent: *May 10, 2016

(54) METHOD AND APPARATUS FOR MANAGING THE INTERCONNECTION BETWEEN NETWORK DOMAINS

(71) Applicant: RPX Clearinghouse LLC, San Francisco, CA (US)

(72) Inventor: Dinesh Mohan, Kanata (CA)

(73) Assignee: RPX CLEARNGHOUSE LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,338

(22) Filed: Oct. 6, 2014

(65) Prior Publication Data

US 2015/0092536 A1    Apr. 2, 2015

Related U.S. Application Data

(63) Continuation of application No. 12/006,291, filed on Dec. 31, 2007, now Pat. No. 8,854,982.

(60) Provisional application No. 60/966,784, filed on Aug. 30, 2007.

(51) Int. Cl.
| | |
|---|---|
| *H04L 12/24* | (2006.01) |
| *H04L 12/26* | (2006.01) |
| *H04L 12/733* | (2013.01) |
| *H04L 12/46* | (2006.01) |
| *H04L 12/707* | (2013.01) |
| *H04L 12/753* | (2013.01) |

(52) U.S. Cl.
CPC ............ *H04L 41/0659* (2013.01); *H04L 12/24* (2013.01); *H04L 12/462* (2013.01); *H04L 41/00* (2013.01); *H04L 41/0668* (2013.01); *H04L 41/0893* (2013.01); *H04L 43/0811* (2013.01); *H04L 45/122* (2013.01); *H04L 45/22* (2013.01); *H04L 45/48* (2013.01); *H04L 41/06* (2013.01)

(58) Field of Classification Search
CPC ......... H04L 12/24; H04L 41/00; H04L 45/48; H04L 41/0668; H04L 43/0811
See application file for complete search history.

(56) References Cited

U.S. PATENT DOCUMENTS

| | | | |
|---|---|---|---|
| 5,684,961 | A | 11/1997 | Cidon et al. |
| 6,816,585 | B1 | 11/2004 | Blatt et al. |
| 7,345,991 | B1 | 3/2008 | Shabtay et al. |

(Continued)

OTHER PUBLICATIONS

Non-Final Office Action for U.S. Appl. No. 12/006,291, mailed Oct. 16, 2009, 12 pages.

(Continued)

*Primary Examiner* — Donald Mills
*Assistant Examiner* — Henry Baron
(74) *Attorney, Agent, or Firm* — Withrow & Terranova, PLLC

(57) ABSTRACT

A control protocol is run in the interconnect region between network domains so that the interconnect region may be managed using a separate control plane. According to an embodiment of the invention, a spanning tree protocol is used to establish a separate spanning tree within the interconnect region. To avoid loop formation within the interconnect region, links interconnecting adjacent edge nodes that are part of the interconnect region and which belong to a given domain are allowed to pass control frames but not data frames. OAM may be used detect link failure of a link between adjacent nodes on a given domain.

20 Claims, 5 Drawing Sheets

(56) References Cited

U.S. PATENT DOCUMENTS

| | | | |
|---|---|---|---|
| 7,657,619 B1 * | 2/2010 | Yang | 709/223 |
| 7,688,756 B2 | 3/2010 | Allan et al. | |
| 2003/0223379 A1 | 12/2003 | Yang et al. | |
| 2004/0225728 A1 | 11/2004 | Huggins et al. | |
| 2008/0045272 A1 | 2/2008 | Wang et al. | |
| 2008/0279196 A1 | 11/2008 | Friskney et al. | |

OTHER PUBLICATIONS

Final Office Action for U.S. Appl. No. 12/006,291, mailed May 6, 2010, 14 pages.

Non-Final Office Action for U.S. Appl. No. 12/006,291, mailed Feb. 14, 2012, 13 pages.

Non-Final Office Action for U.S. Appl. No. 12/006,291, mailed Sep. 11, 2012, 12 pages.

Final Office Action for U.S. Appl. No. 12/006,291, mailed Jan. 8, 2013, 11 pages.

Non-Final Office Action for U.S. Appl. No. 12/006,291, mailed Aug. 6, 2013, 5 pages.

Final Office Action for U.S. Appl. No. 12/006,291, mailed Mar. 20, 2014, 6 pages.

* cited by examiner

METHOD AND APPARATUS FOR MANAGING THE INTERCONNECTION BETWEEN NETWORK DOMAINS

CROSS REFERENCE TO RELATED APPLICATIONS

This application is a continuation of co-pending U.S. patent application Ser. No. 12/006,291, filed on Dec. 31, 2007, entitled "METHOD AND APPARATUS FOR MANAGING THE INTERCONNECTION BETWEEN NETWORK DOMAINS," which claims the benefit of provisional patent application Ser. No. 60/966,784, filed Aug. 30, 2007, entitled "RESILIENT HANDOFF—PBT/PBB/MPLS INTERWORKING," the disclosures of which are hereby incorporated herein by reference in their entireties.

BACKGROUND OF THE INVENTION

1. Field of the Invention

This application relates to interconnections between networks and, more particularly, to a method and apparatus for managing the interconnection between network domains.

2. Description of the Related Art

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements.

Ethernet is a well known networking protocol that has been defined by the Institute of Electrical and Electronics Engineers (IEEE) as 802 standards. Conventionally, Ethernet has been used to implement networks in enterprises such as businesses and campuses, and other technologies have been used to transport network traffic over longer distances. As the Ethernet standards have evolved over time, Ethernet has become more viable as a long distance transport technology as well.

FIG. 1 shows several fields that have been added to the Ethernet standard over time. As shown in FIG. 1, the original Ethernet frame format specified by IEEE 802.1 includes a source address (C-SA) and a destination address (C-DA). IEEE 802.1Q added a Customer VLAN tag (C-Tag) which includes an Ethertype, TCI information, and customer VLAN ID. IEEE 802.1ad added a provider VLAN tag (S-Tag), which also includes an Ethertype, TCI information, and subscriber VLAN ID. The C-Tag allows the customer to specify a VLAN, while the S-Tag allows the service provider to specify a VLAN on the service provider's network for the frame. These tags also allow the customer and subscriber to specify other aspects which are not relevant to an understanding of the contribution disclosed herein. When a network is implemented using 802.1ad it may be referred to as Q in Q encapsulation or Provider Bridging (PB). A domain implemented using this Ethernet standard will be referred to as a Provider Bridging (PB) domain.

The Ethernet standard has evolved to also allow for a second encapsulation process to take place as specified in IEEE 802.1ah. Specifically, an ingress network element to a service provider's network may encapsulate the original Ethernet frame with an outer MAC header including a destination address on the service provider's network (B-DA), a source address on the service provider's network (B-SA), a VLAN ID (B-VID) and a service instance tag (I-SID). The combination of customer MAC addresses C-SA and C-DA with the I-SID are commonly referred to as the I-Tag. A domain implemented using this Ethernet standard will be referred to as a Provider Backbone Bridging (PBB) domain.

There are also two other Ethernet standards that have been developed or which are in the process of being developed that may be used in one or more of the domains. Specifically, IEEE 802.1Qay specifies a way for the network elements to switch traffic based on the B-DA and B-VID rather than just forwarding the traffic according to the B-DA. The header of the frames forwarded on an Ethernet network established using this technology is not changed, but the manner in which the information is used is changed to allow forwarding to take place in a different manner. A network domain that forward traffic using this forwarding paradigm will be referred to as Provider Backbone Trunking (PBT).

PBT, PBB, PB, and the original Ethernet standard use a spanning tree protocol to determine which links should be used to broadcast traffic on the network and which links should be used to forward unicast traffic on the network. To overcome some of the shortcomings of using spanning trees, another Ethernet standard is in the process of being developed as IEEE 802.1aq, in which a shortest path routing protocol such as Intermediate System to Intermediate System (IS-IS) or Open Shortest Path First (OSPF) is used in the control plane to establish forwarding paths through the network. Traffic on the domain may then be forwarded based on the B-DA and B-VID in a manner similar to PBT, but from a control perspective a shortest path routing protocol is used instead of a spanning tree to define routes through the network. A domain implemented in this manner will be referred to herein as a Provider Link State Bridging (PLSB) domain. PLSB is described in greater detail in U.S. patent Ser. No. 11/537,775, filed Oct. 2, 2006, entitled "Provider Link State Bridging," the content of which is hereby incorporated herein by reference. Since PLSB refers to the control plane, it may be used to control forwarding of packets while allowing encapsulation of the packets using PB, PBB, or PBT as described above.

As mentioned above, spanning trees are commonly used in many Ethernet network domains. There are several flavors of Spanning Tree Protocols (STPs). The basic spanning tree protocol implements one tree for a given domain, and this tree is then used for all traffic. There are two variations of the basic Spanning Tree Protocol. Rapid Spanning Tree Protocol (R-STP) provides for rapid recovery and is defined by IEEE 802.1D. Multiple Spanning Tree Protocol (M-STP) provides for multiple spanning tree instances to be used in a given domain in which different VLAN IDs is associated with each of the spanning tree instances. M-STP is defined by IEEE 802.1s. The various Spanning Tree Protocols will be collectively referred to as "xSTP".

There are instances where it is desirable to limit the extent or range of a particular network. For example, a company may own a network and want to limit visibility into the network. Similarly, different network providers may want to maintain the internal structure of the network proprietary. In other instances, when the number of network elements on a network increases so that the network is too large, it may be desirable to split the network into different domains so that different routing instances or other control planes may be used to control operation of each of the several networks.

When a network is divided into two parts (domains) or where different networks owned by different entities, it is often desirable to connect the networks to allow data to be exchanged between the networks. However, the interconnection should occur such that control information is able to be contained within the network domain to limit visibility between domains. This allows customers to transmit data across the interconnected networks while maintaining the independence of the various network domains.

FIG. 2 illustrates an example of a network 10 in which two domains 12A and 12B are coupled at an interconnect region 14. The domains may be implemented using one of the Ethernet technologies described above. Alternatively, one of the domains may be implemented using another technology such as Multi-Protocol Label Switching (MPLS). MPLS is defined by the Internet Engineering Task Force, which has promulgated many documents relating to its operation. The interconnect region 14 may thus be used to interconnect a MPLS network with one of the Ethernet technologies, or may be used to interconnect domains that are both implemented using the same or different Ethernet technologies.

When two networks are to be connected, it is desirable to allow the interconnection to occur in a way such that the interconnection does not cause a single point of failure in the network. For example, if two networks are connected by a single link between two network elements (one on each network) the link that interconnects the two networks provides a single point of failure, such that if the link fails the entire connection between the network domains fails. Similarly, where a single link is used, each of the network elements interfaced to the link represent a single point of failure such that if either of them fails, the interconnection fails.

FIGS. 3A-3D show several configurations that may be employed at the interconnect region 14 between domains 12A, 12B to avoid one or more single points of failure. Specifically, FIG. 3A shows a dual homed connection in which one node 16 on domain 12A is connected to two nodes 18 on domain 12B. FIG. 3B shows a dual node parallel interconnection, in which there are two nodes 16, 18 on each domain that connect to two nodes on the other domain, but the nodes within the domain are not connected. This will be referred to as a dual node parallel interconnect. FIG. 3C shows a dual node square interconnect where there are dedicated links between each of the dual nodes on each of the domain. FIG. 3D shows a dual node full mesh interconnect in which each of the dual nodes on each of the domain is interconnected with each of the other nodes at the interconnection point. The different interconnections provide different levels of protection, depending on the number of nodes and interconnects between the nodes that are able to provide redundancy in the event of a failure.

Due to the large number of protocols that may be used in the network domains, and the several different ways in which the network domains may be interconnected, it would be advantageous to provide a way in which the interconnection could be managed in a systemic and intelligent fashion.

SUMMARY OF THE INVENTION

A control protocol is run in the interconnect region between network domains so that the interconnect region may be managed using a separate control plane. According to an embodiment of the invention, a spanning tree protocol is used to establish a separate routing tree within the interconnect region. To avoid loop formation within the interconnect region, links interconnecting adjacent edge nodes that are part of the interconnect region and which belong to a given domain are allowed to pass control frames but not data frames. OAM may be used detect link failure of a link between adjacent nodes on a given domain.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 4:
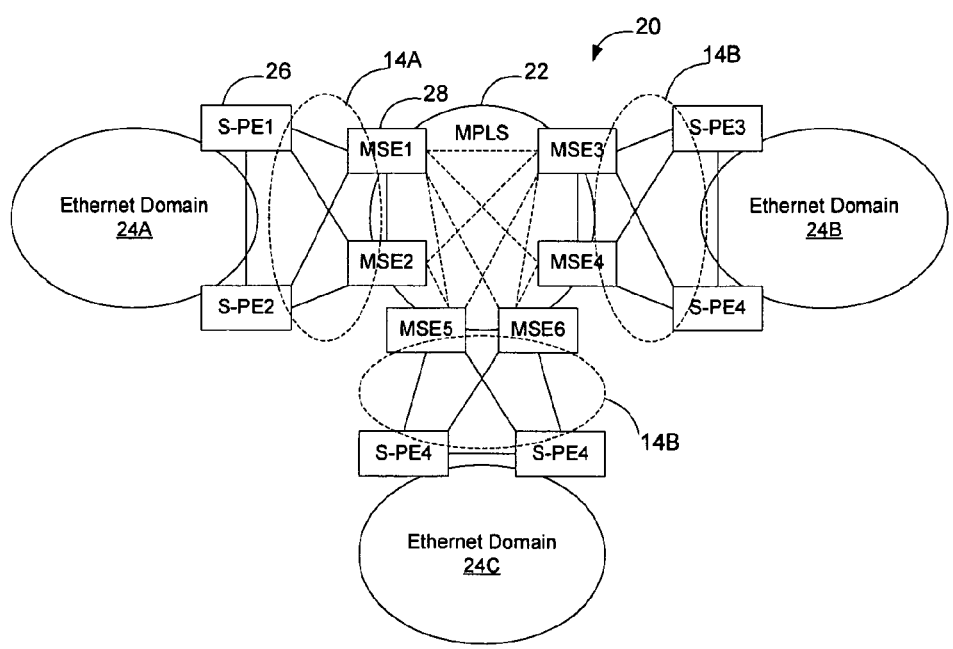
FIG. 4 is a functional block diagram of a network having several domains that may be interconnected using an interconnect region according to an embodiment of the invention.

FIG. 4 illustrates an example network 20 in which a MPLS domain 22 is used to interconnect multiple Ethernet domains 24A-24C. An interconnect region 14A, 14B, 14C exists between the MPLS domain 22 and each of the Ethernet domains 24A-24C. On the Ethernet side of the interconnect region, one or more Switching Provider Edge (S-PE) network elements 26 are provided to perform inter-domain transmission of packets on the network 20. On the MPLS side of the interconnect region, one or more Multi-Service Edge (MSE) network elements 28 are provided to perform inter-domain transmission of packets on the network 20. Specifically, in the example shown in FIG. 4, the interconnect region 14A includes S-PE1, S-PE2 associated with Ethernet domain 24A, and MSE1 and MSE2 associated with the MPLS domain 22. Interconnect region 14B includes S-PE3, S-PE4 associated with Ethernet domain 24B, and MSE3 and MSE4 associated with the MPLS domain 22. Interconnect region 14C includes S-PE5, S-PE6 associated with Ethernet domain 24C, and MSE5 and MSE6 associated with the MPLS domain 22. Within the MPLS domain, multiple pseudowires (shown with dashed lines within MPLS domain 22) may be established to enable packets to be transported across the MPLS domain 22 in the usual manner. Different ways of implementing the MPLS domain exist and the invention is not limited to the particular way in which the MPLS domain is set up.

The Ethernet domains 24A, 24B, 24C may be implemented using any one of the Ethernet technologies described. For example, the Ethernet domains may be established using Provider Bridging (PB), Provider Backbone Bridging (PBB), Provider Backbone Trunking (PBT) or Provider Link State Bridging (PLSB). Embodiments of the invention may be used to manage the interconnect region 14 between a MPLS domain and any one of these types of Ethernet domains. Additionally, embodiments of the invention may be used to manage the interconnect region between multiple Ethernet domains and is not limited to an implementation that manages the interconnect region between an Ethernet domain and a MPLS domain.

Figure 5:
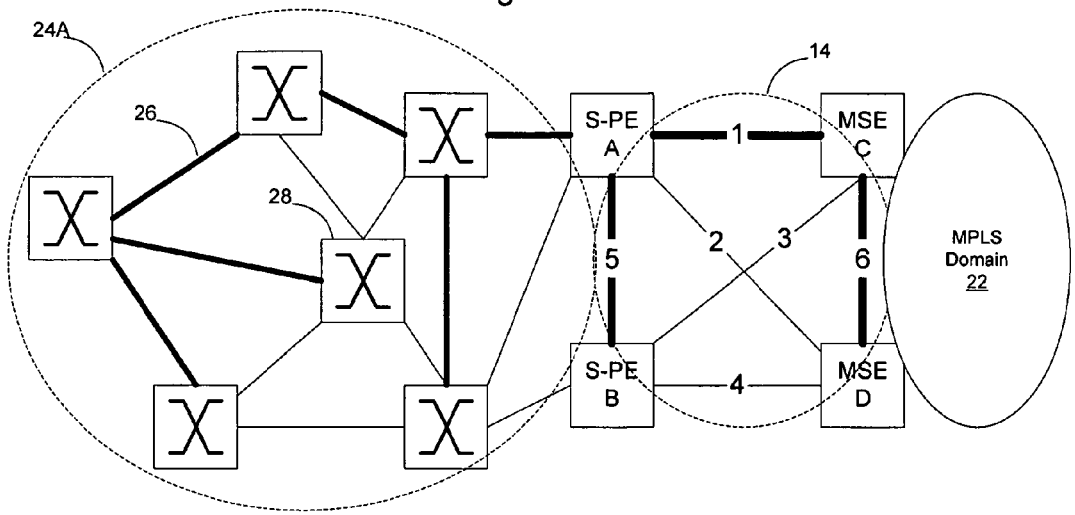
FIG. 5 is a functional block diagram of a network in which a spanning tree from one of the network domains is extended into the interconnect region to manage the interconnect region according to an embodiment of the invention.

FIG. 5 shows an interconnection between two domains, Domain 24A and Domain 22. A first set of network elements A and B associated with domain 24A are designated to interconnect with a second set of network elements C and D associated with domain 22. In the example shown in FIG. 5, the network elements A, B, C, D are interconnected using a full mesh interconnection, in which links 1-6 form the interconnection region between the nodes. To prevent loops from forming, only one of the links 1, 2, 3, and 4 should be active at any give time. This prevents multiple copies of a packet from being transmitted between the domains and ensures that no end-to-end loops are created. However, the links may be load shared such that different VLANs may use different active links. For example, VLAN-1 may use link 1 as its active link at the interconnect 14, VLAN-2 may use link 2 as its active link at the interconnect, etc. Thus, the links may be selected on a per-VLAN basis or on a per-port basis depending on how the interconnect is managed/established.

As shown in FIG. 5, according to one embodiment of the invention, a spanning tree instance 26 is run between network elements 28 on the Ethernet domain 24A. In the embodiment shown in FIG. 5, the spanning tree instance 26 extends into the interconnect region 14. By extending the spanning tree 26 into the interconnect region, control packets will be forwarded over the broadcast tree (spanning tree) to the network elements in the interconnect region 14. This requires network engineering to take place to force the shown topology to occur in the spanning tree. Additionally, in this embodiment, the MSEs C, D need to peer or terminate control packets—Broadcast Protocol Data Units (BPDUs) designated as control frames—so that the control packets are not forwarded across the Pseudo Wire (PW) instances on the MPLS network in domain B 22. One way to designate a BPDU as a control frame is to address the control frame to a destination address that has been designated for use in passing control information between nodes on the network.

To prevent loop formation, in this embodiment, the link interconnecting the MSEs C, D on the MPLS network (link 6) needs to be implemented to only pass PBDUs and not data traffic. Where the MSEs both peer into the MPLS domain, and implement the same Virtual Switch Instance, allowing the MSEs to transmit data between each other over link 6 could cause multiple copies of the data packets to be forwarded into the MPLS domain, which could cause loop formation. Accordingly, the link 6 interconnecting the MSEs at the interconnect is implemented to only allow control frames to be transmitted between the MSEs C and D, but such that data frames are not able to be transmitted between these MSEs. One way to do this is to configure the Access Control List (ACL) for the link in each MSE such that control frames identified by an address designated for addressing control frames, e.g. BPDUs, may be transmitted over the link but that regular data unicast and multicast frames are not transmitted on the link.

Figure 6:
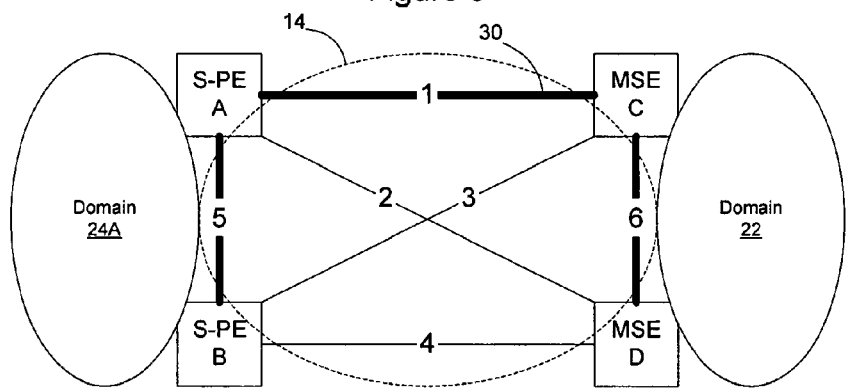
FIG. 6 is a functional block diagram of a network interconnect region extending between two domains in which a separate spanning tree is implemented to manage the interconnect region according to an embodiment of the invention.

FIG. 6 shows an alternative embodiment in which a separate spanning tree 30 is implemented at the interconnect region 14. Specifically, as shown in FIG. 6, one of the spanning tree protocols such as STP, rSTP, or mSTP (xSTP) is used to create a spanning tree in the interconnect region that will control dissemination of BPDUs within the interconnect region 14. In this embodiment there are two STP regions—one in domain 24A (not shown) and a separate spanning tree in the interconnect region 14.

The MSEs in this embodiment need to peer or terminate BPDUs so that the BPDUs are not forwarded across the VPLS PW instances. MSEs need to be connected via a special Ethernet link (link 6) which is implemented as described above in connection with FIG. 5 to only pass BPDUs and not forward data traffic. Thus, a special link 6 may be used to interconnect the MSEs C, D (see FIG. 6) which may be used to pass control traffic, but not data traffic. If domain A is an Ethernet domain, such as a PB or PBB domain, link 5 interconnecting the S-PEs A and B may also be configured in a manner similar to link 6. Specifically, link 5 may be configured to forward control traffic e.g. BPDUs but not data traffic if desired.

As shown in FIG. 6, it is desirable for S-PE A to have only one of links 1 and 2 active at any one time. However, the other link should be available as a standby link. This may be implemented on a per-VLAN basis such that the links 1 and 2 may be used by different groups of VLANs and the other link, in that instance, may be used as a backup link. For example, VLAN 1 may be assigned to link 1 as a primary with link 2 as a backup, and conversely VLAN 2 may be assigned to link 2 as a primary link with link 1 as a backup. Assignment of traffic to links may thus take place on a per-VLAN basis. Alternatively, assignment of traffic to links may be implemented on a per-port basis.

In either instance, link 6 becomes a critical link because its failure could lead to two links among links 1, 2, 3, and 4 becoming active, leading to loop formation. Under normal operation, when link 6 is not experiencing failure, BPDUs will be broadcast on all links on the network and the network elements will administratively block particular links to cause the spanning tree to only allow one link between links 1, 2, 3, and 4 to be active. Thus, in normal operation, S-PE B will receive BPDUs on links 5, e, and 4, and will block ports connected to links 3 and 4 to cause the spanning tree to have the configuration shown in FIG. 6. However, if link 6 experiences failure, S-PE B may un-block link 4, thus enabling a loop to form. Specifically, upon failure the spanning tree protocol would select another link, such as link 4, to replace link 6, to ensure connectivity to all network nodes. This will cause more than one of links 1, 2, 3, and 4, to be active which can cause multiple copies of data packets to be forwarded into the MPLS domain. Note, that S-PE A will not cause links 1 and 2 to be active at the same time so that the spanning tree will not select both links 1 and 2. However, coordination between S-PE A and S-PE B is required to prevent the spanning tree from reconfiguring itself when link 6 fails to prevent formation of a loop at the interconnect.

Thus, failure of link 6 may be considered critical, in that failure of link 6 will cause two of links 1, 2, 3, and 4 to become active. These links also are implemented to pass both control and data packets, so that multiple copies of the same data packets will be transmitted from domain 24A to the MSEs on domain 22. This may lead to loop formation. Thus, it is important for the S-PEs to be able to detect when link 6 fails, so that one or more of the links 1, 2, 3, 4 may be administratively disabled until the failure of link 6 may be repaired.

Figure 7:
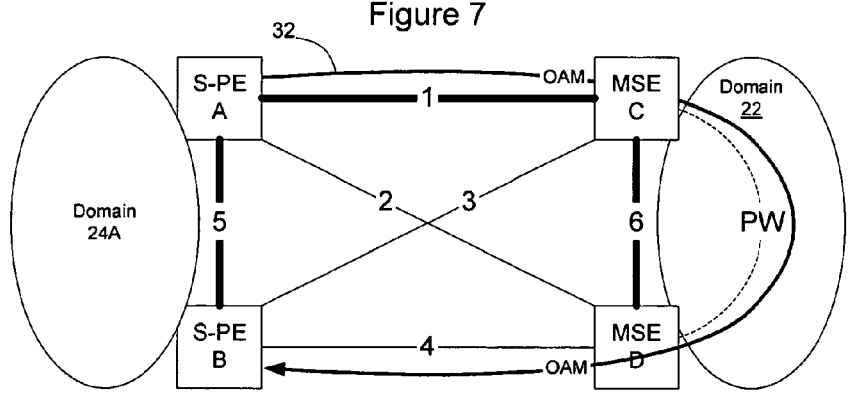
FIG. 7 is a functional block diagram of the network of FIG. 6 in which Operation Administration and Maintenance (OAM) Management Entity (ME) is used to detect link failure of link 6 according to an embodiment of the invention.

According to an embodiment of the invention, as shown in FIG. 7, an OAM Management Entity (ME) 32 may be used to detect whether a loop has formed. Specifically, an OAM ME may be created between S-PE A and S-PE B such that SPE-A will transmit OAM messages addressed to S-PE B over the interconnect to the MSEs. In the illustrated embodiment link 1 has been selected by the spanning tree protocol to be the active link. Accordingly, S-PE A would transmit OAM messages unicast addressed to S-PE B over link 1 to MSE C.

When MSE C receives the unicast messages, it will see that the OAM message is addressed to MSE D and try to forward the message over link 6. However, the access control list for link 6 specifies that link 6 is only to be used to forward BPDUs. Since OAM packets look like data packets, MSE-C will not be able to forward the unicast message to MSE-D on link 6.

MSE-C will, however, be able to forward the unicast message to MSE-D over a pseudo-wire in MPLS domain 22. When MSE-D receives an OAM packet, it terminates the packet since link 4 is blocked by the spanning tree. Accordingly, while link 6 is operational, the OAM message will be dropped by MSE D and not forwarded to S-PE B.

However, if link 6 fails, S-PE B will no longer receive BPDUs over link 4. Thus, S-PE B will unblock link 4 to cause it to become part of the active topology at the interconnect. In this event, when the OAM message is received by MSE-D from the MPLS domain, it will be able to forward the OAM message to S-PE B. Accordingly, receipt of OAM messages from S-PE A by S-PE B may be interpreted by S-PE B as an indication that link 6 has failed.

Thus, under normal circumstances, the OAM messages that are sent by S-PE A to S-PE B over the interconnect will not reach S-PE B, but upon failure of link 6 the OAM messages will reach S-PE B. Accordingly, if S-PE B receives a unicast OAM message addressed to itself it may conclude that link 6 has failed and disable one or more of links 2, 3, 4 to prevent the formation of a loop.

Since the spanning tree topology at the interconnect should select both links 5 and 6 as part of the spanning tree, the cost of links 1, 2, 3, and 4 should be kept higher than links 5 and 6. This will automatically cause the spanning tree to select links 5 and 6 and one of links 1, 2, 3, and 4 for the spanning tree topology. When a MSE detects an xSTP topology change notification (TCN) it will issue a MAC withdrawal message.

In the previous example, it was assumed that the domain 24A was an Ethernet domain running a spanning tree protocol such as a PB, PBB, or PBT domain. Alternatively domain 24A may be implemented as a PLSB domain in which shortest path forwarding is used to forward data within the domain. Thus, it is possible to use xSTP in the interconnect region while using a different technology that does not rely on spanning tree, such as PLSB, in the Ethernet domain 24A. Additionally, although an example was provided in which domain 22 was an MPLS domain, the interconnect 14 may also be used to interconnect domain 24A with another Ethernet domain. Thus, domain 22 may be implemented as a PB, PBB, PBT, or PLSB Ethernet domain instead of an MPLS domain.

At times Provider Backbone Trunking (PBT) specified in IEEE 802.1Qay may coexist on a PBB domain using Mac-in-Mac encapsulation. In this instance, the interconnect may be established such that the CST of MSTP is limited to only non-PBT VLANs such that all paths are available for PBT trunks.

Figure 1:
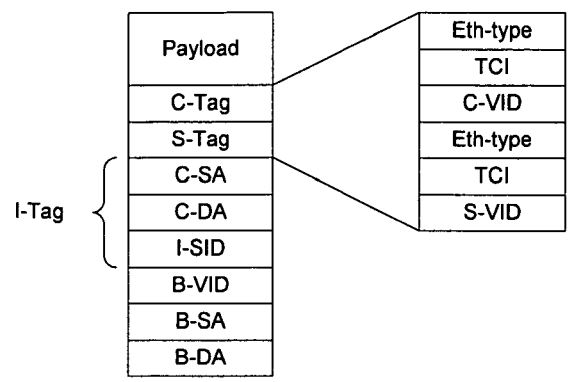
FIG. 1 is a functional block diagram of an Ethernet frame format.
Figure 2:
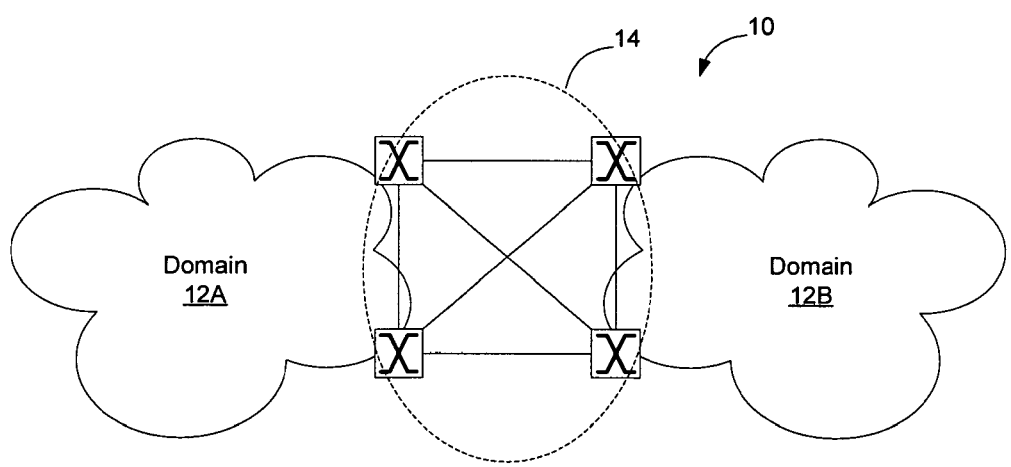
FIG. 2 is a functional block diagram of a reference network.
Figure 3A:
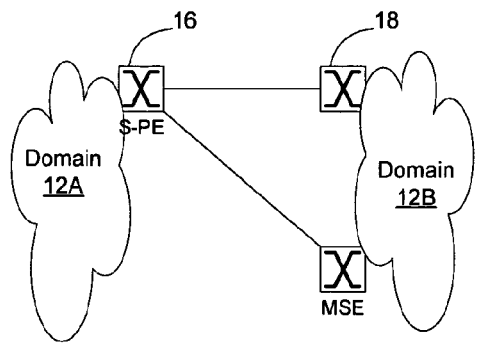
FIGS. 3A-3D show several interconnect architectures.
Figure 3B:
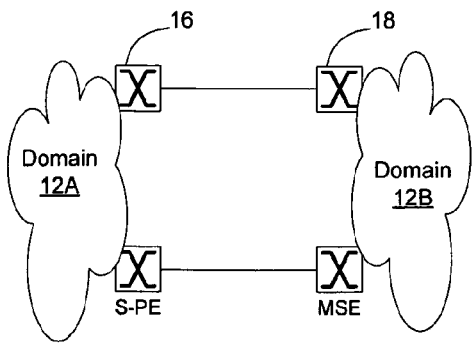
Figure 3C:
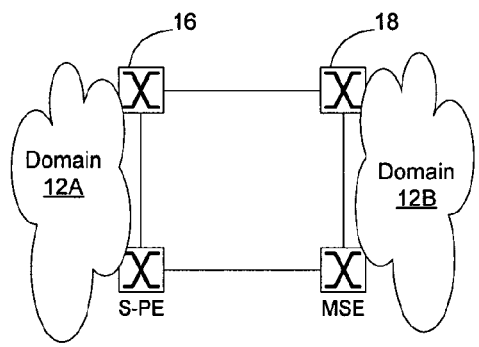
Figure 3D:
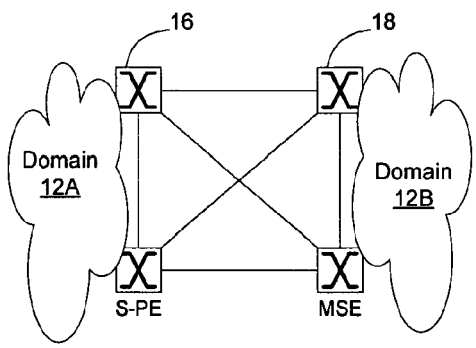
Figure 8:
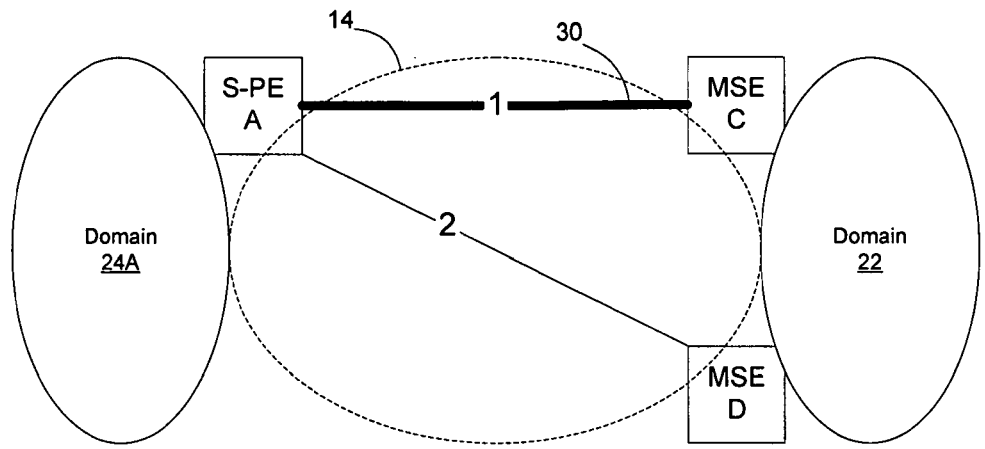
FIG. 8 is a functional block diagram similar to the functional block diagram of FIG. 6, in which a different interconnect architecture is used to implement the interconnect region, but where the S-PE maintains only one link active on the interconnect region per port or VLAN according to an embodiment of the invention.

In the embodiment shown in FIGS. 5-7, the interconnect region was implemented using a full mesh connection. Alternatively, as shown in FIG. 8, the interconnect region may be implemented using a dual homed connection topology such as the topology shown in FIG. 3A. Thus, a separate spanning tree instance may be instantiated at the interconnect on different interconnection topologies and the invention is not limited to an implementation that utilizes a full mesh interconnection topology.

Figure 9:
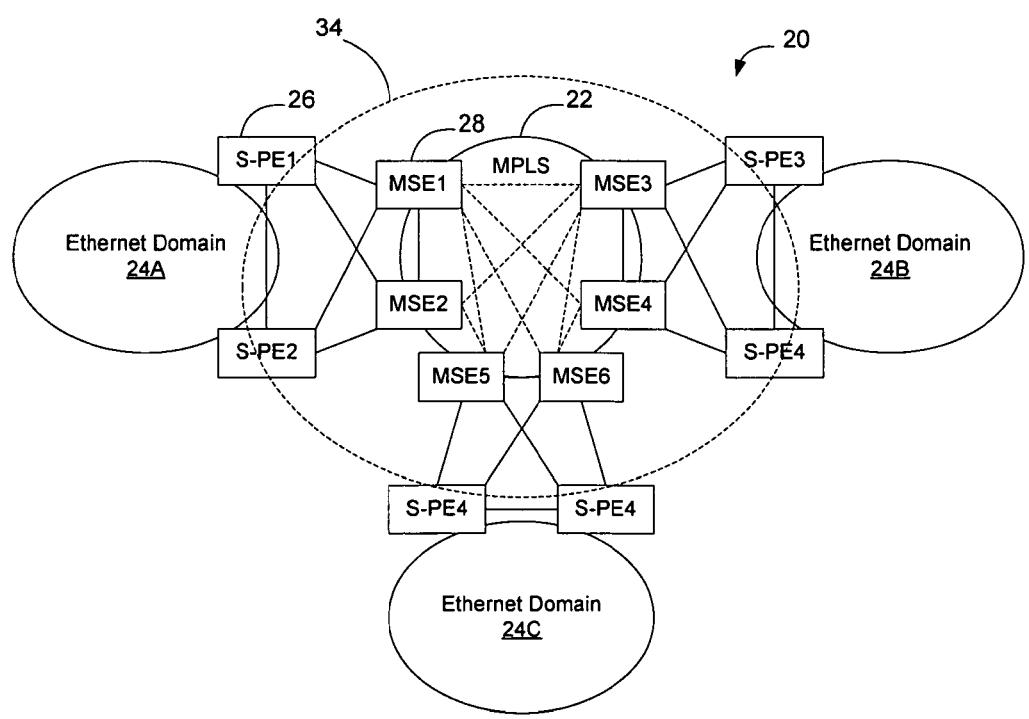
FIG. 9 is a functional block diagram of a network having several domains, in which PLSB is used to manage multiple interconnect regions between Ethernet domains and an MPLS domain according to an embodiment of the invention.

FIG. 9 shows an example of how PLSB may be used across the S-PEs to allow PLSB to be used to manage the interconnect region 34 between a plurality of domains 24 interconnected via a MPLS or other core network 22. In the embodiment shown in FIG. 9, S-PEs participate in PLSB as the backbone area, and install forwarding state to each other per normal PLSB. In this way PLSB may be used to manage the interconnect region of multiple domains collectively while using the connectivity provided by the MPLS domain to interconnect the various connection regions. Since PLSB causes shortest paths to be established between each S-PE and each other S-PE, shortest paths will automatically be established across the interconnect regions between the S-PEs and the MSEs that have a PW to the egress MSE that can connect the S-PE to its peer S-PE. This has the advantage that the MSEs in this embodiment do not need to peer or participate in BPDUs or PLSB. The MSEs also do not need to be connected by any special Ethernet links.

In this embodiment, PLSB is run across the S-PEs that are interconnected over the MPLS network. Only the S-PEs run PLSB, the MSEs do not participate in the control plane and thus forward BPDUs like normal packets. Thus, when the S-PEs configure their forwarding tables, the identity of the S-PE will be added as a route in the forwarding table. When a packet arrives at a S-PE, it will look up the destination address and VLAN ID of the packet and forward the packet to the elected S-PE on the egress network domain. In this manner PLSB may be used to establish an interconnect region that spans multiple interconnect regions while treating the underlying MPLS network as a transport network.

Figure 10:
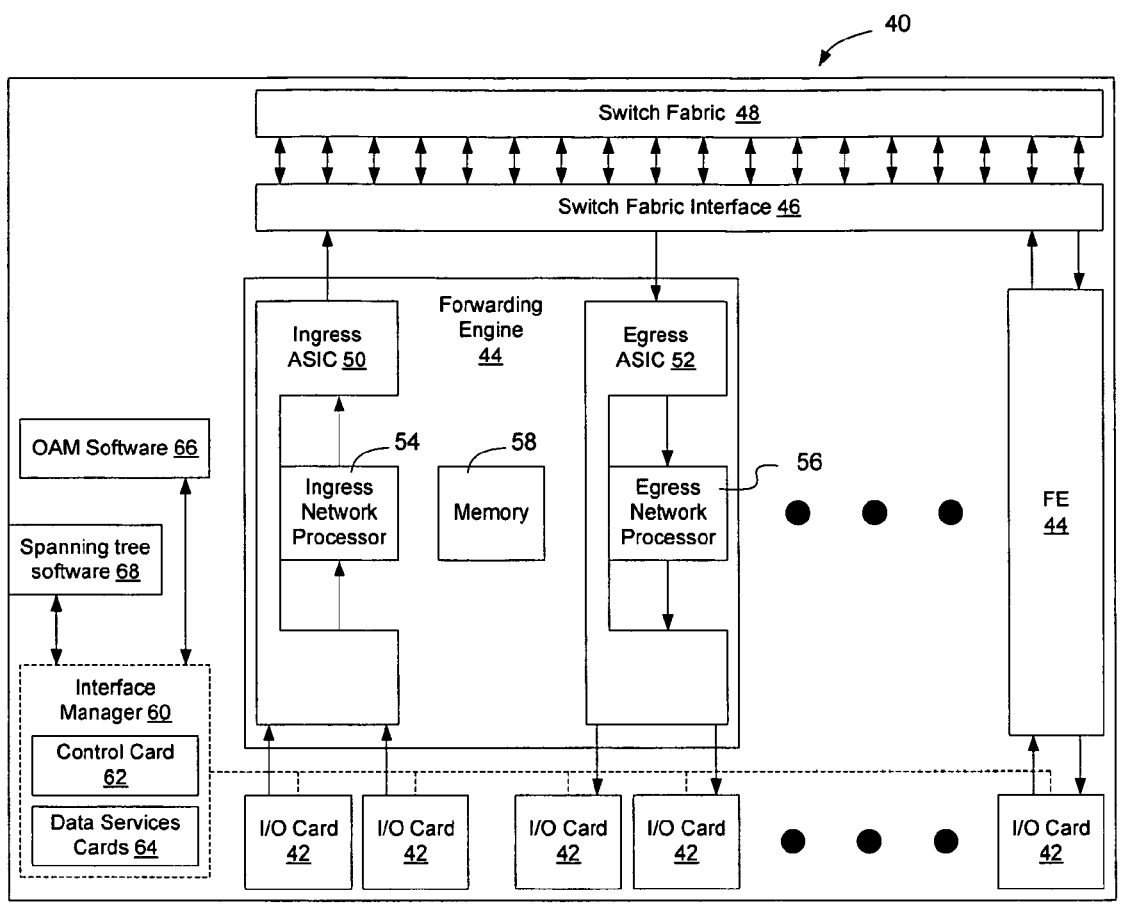
FIG. 10 is a functional block diagram of a network element according to an embodiment of the invention.

FIG. 10 shows one embodiment of a network element 40 that may be configured to implement an embodiment of the invention. The network element may be used to implement one of the S-PEs 26, one of the MSEs 28, or another network element on the network 20. The invention is not limited to a network element configured as illustrated, however, as the invention may be implemented on a network element configured in many different ways. The discussion of the specific structure and methods of operation of the embodiment illustrated in FIG. 10 is intended only to provide one example of how the invention may be used and implemented in a particular instance. The invention more broadly may be used in connection with any network element configured to handle Ethernet frames in a communications network.

As shown in FIG. 10, the network element generally includes Input/Output (I/O) cards 42 configured to connect to links in the communications network. The I/O cards 42 may include physical interfaces, such as optical ports, electrical ports, wireless ports, infrared ports, or ports configured to communicate with other conventional physical media, as well as configurable logical elements capable of operating as MAC (layer 2) ports under the direction of an interface manager, described in greater detail below.

One or more forwarding engines 44 are provided in the network element to process frames received over the I/O cards 42. The forwarding engines 44 forward frames to a switch fabric interface 46, which passes the packets to a switch fabric 48. The switch fabric 48 enables a frame entering on a port on one or more I/O cards 42 to be output at one or more different ports in a conventional manner. A frame returning from the switch fabric 48 is received by one of the forwarding engines 44 and passed to one or more I/O cards 42. The frame may be handled by the same forwarding engine 44 on both the ingress and egress paths. Optionally, where more than one forwarding engine 44 is included in the network element 40, a given frame may be handled by different forwarding engines on the ingress and egress paths. The invention is not limited to any particular forwarding engine 44, switch fabric interface 46, or switch fabric 48, but rather may be implemented in any suitable network element configured to handle Ethernet frames on a network. One or more Application Specific Integrated Circuits (ASICs) 50, 52 and processors 54, 56 may be provided to implement instructions and processes on the forwarding engines 44. Optionally, a memory 58 may be included to store data and instructions for use by the forwarding engines.

An interface management system 60, optionally containing one or more control cards 62 and one or more data service cards 64, may be provided to create and manage interfaces on the network element. The interface management system may interact with an OAM module 66 locally instantiated on the network element or interfaced to the network element over a management interface port. The OAM module 66 may be implemented in software, firmware, hardware, or in any other manner as discussed in greater detail here. The OAM module 66 is responsible for sending and receiving OAM frames to allow the interface management system 60 to administratively disable one or more of the ports implemented on the I/O cards 42 upon detection of a link failure (of link 6) on the network. Spanning tree software 68 may also be provided to enable the network element to participate in calculating one or more spanning trees to be implemented in the interface region 14.

When the functions described herein are implemented in software, the software may be implemented as a set of program instructions configured to operate in control logic on a network element that are stored in a computer readable memory within the network element and executed on a microprocessor. For example, in the network element of FIG. 10, the OAM functions may be performed by OAM module 66 implemented as software and executed on a processor associated with the interface manager 60. Likewise, the spanning tree functions described herein may be performed by Spanning Tree module 68 and executed on a processor associated with the interface manager 60. However, in this embodiment as with the previous embodiments, it will be apparent to a skilled artisan that all or some of the logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof.

Programmable logic can be fixed temporarily or permanently in a tangible medium such as a read-only memory chip, a computer memory, a computer disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of managing an interconnect region between a first network domain and a second network domain, the interconnect region comprising a first network element and a second network element connecting the interconnect region to the first network domain and a plurality of links extending between the first network domain and the second network domain, the method comprising:

establishing a control protocol instance in the interconnect region, the control protocol instance allowing at most one link of the plurality of links extending between the first network domain and the second network domain to be selected as an active link for a Virtual Local Area Network (VLAN) with remaining links being inactive for the VLAN;

establishing an Operation, Administration and Maintenance (OAM) management entity between the first network element and the second network element;

transmitting a plurality of OAM frames by the first network element on the OAM management entity over the active link between the first network domain and the second network domain, the plurality of OAM frames being addressed to the second network element;

monitoring the plurality of OAM frames at the second network element; and determining that at least one of the plurality of OAM frames received at the second network element is one of the plurality of OAM frames transmitted by the first network element, administratively disabling a link over which the at least one OAM frame was received by the second network element.

2. The method of claim 1, wherein the control protocol instance is established to cause selection of the active link to be implemented on a per-port basis.

3. The method of claim 1, wherein multiple control protocol instances are established to cause selection of the active link to be implemented on a per-VLAN basis.

4. The method of claim 1, wherein a single network element connected to the second network domain is dual homed by two respective links to the first network element and the second network element which are connected to the first network domain, and wherein the single network element explicitly selects one of the two respective links as the active link and designates the other of the two respective links as a backup link.

5. The method of claim 1, wherein the control protocol instance is a single instance of a spanning tree.

6. The method of claim 1, wherein the control protocol instance includes multiple spanning trees to enable the active link to be selected on a per-VLAN basis.

7. The method of claim 1, wherein the control protocol instance is a spanning tree that is used to select the at most one link of the plurality of links extending between the first network domain and the second network domain as the active link.

8. The method of claim 7, wherein the first network domain is an Ethernet network domain and the second network domain is a MultiProtocol Label Switching (MPLS) domain.

9. The method of claim 8, wherein the spanning tree is an extension of a spanning tree in the Ethernet network domain.

10. The method of claim 7, wherein the spanning tree does not extend beyond the interconnect region.

11. The method of claim 7, wherein multiple control protocol instances are established, each of the multiple control protocol instances being a spanning tree, and wherein the multiple control protocol instances are used to enable selection of the active link and designation of backup links to occur on a per-VLAN basis.

12. The method of claim 7, wherein:
the interconnect region further comprises a third network element and a fourth network element connected to the second network domain and four links interconnecting the first network element and the second network element with the third network element and the fourth network element;
a fifth link interconnects the first network element and the second network element;
a sixth link interconnects the third network element and the fourth network element; and
the control protocol instance in the interconnect region allows at most one link of the four links interconnecting the first network element and the second network element with the third network element and the fourth network element to be selected as the active link between the first network domain and the second network domain.

13. The method of claim 12, further comprising engineering the interconnect region by assigning a lower weight to the fifth link and the sixth link than is assigned to the four links to cause the control protocol instance in the interconnect region to automatically select as the active link only one link of the four links.

14. The method of claim 13, wherein the control protocol instance is a single instance of a spanning tree, the spanning tree including the fifth link, the sixth link, and the at most one link of the four links interconnecting the first network element and the second network element with the third network element and the fourth network element as active links in the interconnect region.

15. The method of claim 12, wherein the control protocol instance includes multiple instances of a spanning tree, and wherein each of the multiple instances of the spanning tree are enabled to select the at most one link of the four links interconnecting the first network element and the second network element with the third network element and the fourth network element as active links in the interconnect region on a per-VLAN basis.

16. The method of claim 15, wherein the third network element and the fourth network element connected to the second network domain have access control lists associated with the sixth link, the access control lists being configured to allow control Protocol Data Units (PDUs) to be transmitted over the sixth link but to not allow data PDUs to be transmitted over the sixth link.

17. The method of claim 16, wherein the third network element and the fourth network element terminates the control PDUs so that the control PDUs are not forwarded across the second network domain.

18. The method of claim 1, wherein:
the first network domain is an Ethernet network domain;
the second network domain is a MultiProtocol Label Switching (MPLS) network domain;
the interconnect region comprising the first network domain and the second network domain is a first interconnect region;
a third network domain is connected to the MPLS network domain by a second interconnect region, the third network domain being an Ethernet network domain; and
a common control protocol instance is run on the first interconnect region and the second interconnect region.

19. The method of claim 18, wherein the common control protocol instance causes nodes of the first interconnect region and nodes of the second interconnect region to behave as a single link state protocol controlled Ethernet network.

20. The method of claim 19, wherein each interconnect region of the first interconnect region and the second interconnect region has at least one Ethernet network element configured to interface with a respective Ethernet domain, the method further comprising installing respective routes between respective pairs of Ethernet network elements which follow shortest paths between the respective pairs of the Ethernet network elements via pseudowires in the MPLS network domain.

* * * * *